US011063876B2

(12) United States Patent
Williams, Jr. et al.

(10) Patent No.: US 11,063,876 B2
(45) Date of Patent: *Jul. 13, 2021

(54) AUTOMATICALLY CYCLING AMONG PACKET TRAFFIC FLOWS SUBJECTING THEM TO VARYING DROP PROBABILITIES IN A PACKET NETWORK

(71) Applicant: Cisco Technology, Inc., San Jose, CA (US)

(72) Inventors: John J. Williams, Jr., Pleasanton, CA (US); Mohammed Ismael Tatar, Kanata (CA); David Delano Ward, Somerset, WI (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/505,651

(22) Filed: Jul. 8, 2019

(65) Prior Publication Data

US 2019/0334827 A1   Oct. 31, 2019

Related U.S. Application Data (63) Continuation of application No. 15/641,661, filed on Jul. 5, 2017, now Pat. No. 10,367,749.

(51) Int. Cl.
*H04L 1/00* (2006.01)
*H04L 12/823* (2013.01)
(Continued)

(52) U.S. Cl.
CPC .............. *H04L 47/32* (2013.01); *H04L 47/10* (2013.01); *H04L 47/20* (2013.01);
(Continued)

(58) Field of Classification Search
CPC ......... H04L 47/32; H04L 47/10; H04L 47/20; H04L 47/31; H04L 47/41; H04L 47/12
See application file for complete search history.

(56) References Cited

U.S. PATENT DOCUMENTS

| 8,004,980 B2 * | 8/2011 | Ferguson | H04L 47/10 370/230 |
| 8,170,045 B2 | 5/2012 | Pan et al. | |

(Continued)

FOREIGN PATENT DOCUMENTS

EP   3425862 A1   1/2019

OTHER PUBLICATIONS

Smitha AL. L. Narasimha Reddy, "LRU-RED: An active queue management scheme to contain high bandwidth flows at congested routers," Global Telecommunications Conference, 2001, GLOBECOM '01, pp. 2311-2315, vol. 4, IEEE, New York, NY.

(Continued)

*Primary Examiner* — Abdelnabi O Musa
(74) *Attorney, Agent, or Firm* — The Law Office of Kirk D. Williams (57) ABSTRACT

In one embodiment, a network node automatically cycles among packet traffic flows and subjects the currently selected packet flows to varying drop probabilities in a packet network, such as, but not limited to in response to congestion in a device or network. Packets of a currently selected packet traffic flow are subjected to a drop or forward decision with a higher drop probability than packets of a currently non-selected flow. By cycling through all of these packet traffic flows, all of these packet flows are subjected to the drop or forward decision in the long term approximately uniformly, thus providing fairness to all packet traffic flows. In the short term, packets of a currently selected flow are targeted for possible dropping with a higher drop probability (Continued)

providing unfairness to the currently selected flows over the non-selected flows.

19 Claims, 5 Drawing Sheets

(51) Int. Cl.
    *H04L 12/851*     (2013.01)
    *H04L 12/891*     (2013.01)
    *H04L 12/863*     (2013.01)
    *H04L 12/813*     (2013.01)
    *H04L 12/801*     (2013.01)
    *H04L 12/833*     (2013.01)

(52) U.S. Cl.
    CPC .......... *H04L 47/2483* (2013.01); *H04L 47/31* (2013.01); *H04L 47/41* (2013.01); *H04L 47/6255* (2013.01); *H04L 47/12* (2013.01); *H04L 47/2441* (2013.01); *H04L 47/621* (2013.01)

(56) References Cited

U.S. PATENT DOCUMENTS

| | | |
|---|---|---|
| 10,367,749 B2 | 7/2019 | Williams, Jr. et al. |
| 2007/0070907 A1* | 3/2007 | Kumar .................... H04L 47/30 370/235 |
| 2007/0091802 A1* | 4/2007 | Pan ........................ H04L 43/00 370/230 |
| 2015/0117205 A1* | 4/2015 | Palyi ................. H04W 28/0247 370/235 |
| 2017/0019343 A1* | 1/2017 | De Schepper .......... H04L 47/50 |
| 2019/0014052 A1 | 1/2019 | Williams, Jr. et al. |

OTHER PUBLICATIONS

G.F.Ali Ahammed and Reshma Banu, "Analyzing the Performance of Active Queue Management Algorithms," arXiv preprint, Cornell University Library, 2010, Ithaca, NY (nineteen pages).

D. Lin and R. Morris, "Dynamics of random early detection," in Proc. of ACM SIGCOMM '97, Cannes, France, Oct. 1997, pp. 127-137.

Pan et al., "Approximate Fairness through Differential Dropping," ACM SIGCOMM Computer Communications Review, Apr. 2003, vol. 33, Issue 2, pp. 23-39, ACM Press New York, NY.

Ahn et al., "SWAN: Service Differentiation in Stateless Wireless Ad Hoc Networks," IEEE Infocom 2002, New York, NY, Jun. 2002, pp. 457-466.

Communication of the Extended European Search Report, dated Feb. 1, 2018, EP Application 17183235.5, European Patent Office, Munich, Germany (ten pages).

Response to Extended European Search Report filed in EP Application 17183235.5, dated Jul. 9, 2019, Mathys & Squire LLP, London, England (eighteen pages).

Communication pursuant to Article 94(3) EPC (EPO Office action), dated Sep. 10, 2020, EP Application 17183235.5, European Patent Office, Netherlands (six pages).

* cited by examiner

AUTOMATICALLY CYCLING AMONG PACKET TRAFFIC FLOWS SUBJECTING THEM TO VARYING DROP PROBABILITIES IN A PACKET NETWORK

CROSS-REFERENCE TO RELATED APPLICATIONS

This application is a continuation of U.S. patent application Ser. No. 15/641,661, filed Jul. 5, 2017, which is hereby incorporated by reference in its entirety.

TECHNICAL FIELD

The present disclosure relates generally to forwarding and dropping of packets in response to congestion in the packet network.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. Packet traffic in a network is typically scheduled in a device to efficiently use packet transportation resources.

BRIEF DESCRIPTION OF THE DRAWINGS

The appended claims set forth the features of one or more embodiments with particularity. The embodiment(s), together with its advantages, may be understood from the following detailed description taken in conjunction with the accompanying drawings of which:

DESCRIPTION OF EXAMPLE EMBODIMENTS

1. Overview

Disclosed are, inter alia, methods, apparatus, computer-storage media, mechanisms, and means associated with automatically cycling among packet traffic flows and subjecting the currently selected packet flows to varying drop probabilities in a packet network. In this manner, all packet flows are subjected to the drop or forward decision in a manner that provides approximate uniform fairness to all packet traffic flows in the long term; while in the short term, packets of currently selected flow(s) are targeted with a higher drop probability than those packet flows not currently selected thus providing unfairness to the currently selected flows. In one embodiment, the current drop probability of a non-selected packet flow is at least an order of magnitude less than said current drop probability of a selected packet flow. In one embodiment, the current drop probability of a non-selected packet flow is zero (e.g., effectively or literally not being subjected to a drop determination) or approximates zero. In one embodiment, forwarding of a packet includes enqueuing the packet into a packet queue.

2. Description

Disclosed are, inter alia, methods, apparatus, computer-storage media, mechanisms, and means associated with automatically cycling among packet traffic flows and subjecting the currently selected packet flows to varying drop probabilities in a packet network, such as, but not limited to in response to congestion in a device or network. Packets of the currently selected packet traffic flows are subjected to a drop or forward decision, while packets of other packet traffic flows are not so subjected or subjected to a smaller drop probability (e.g., zero, approximating zero, at least one order of magnitude less). By cycling through all of these packet traffic flows, all of these packet flows are subjected to the drop or forward decision in the long term in providing approximately uniformly fairness to all packet traffic flows. In the short term, packets of a currently selected flow are targeted for possible dropping with a higher drop probability, thus providing unfairness to the currently selected flows, while possibly providing communication efficiencies by affecting the currently selected, but not all flows.

Embodiments described herein include various elements and limitations, with no one element or limitation contemplated as being a critical element or limitation. Each of the claims individually recites an aspect of the embodiment in its entirety. Moreover, some embodiments described may include, but are not limited to, inter alia, systems, networks, integrated circuit chips, embedded processors, ASICs, methods, and computer-readable media containing instructions. One or multiple systems, devices, components, etc., may comprise one or more embodiments, which may include some elements or limitations of a claim being performed by the same or different systems, devices, components, etc. A processing element may be a general processor, task-specific processor, a core of one or more processors, or other co-located, resource-sharing implementation for performing the corresponding processing. The embodiments described hereinafter embody various aspects and configurations, with the figures illustrating exemplary and non-limiting configurations. Computer-readable media and means for performing methods and processing block operations (e.g., a processor and memory or other apparatus configured to perform such operations) are disclosed and are in keeping with the extensible scope of the embodiments. The term "apparatus" is used consistently herein with its common definition of an appliance or device.

The steps, connections, and processing of signals and information illustrated in the figures, including, but not limited to, any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value—the value must be obtained prior to processing it, although some of the associated processing may be performed prior to, concurrently with, and/or after the read operation). Also, nothing described or referenced in this document is admitted as prior art to this application unless explicitly so stated.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the terms "first," "second," etc., as well as "particular" and "specific" are typically used herein to denote different units (e.g., a first widget or operation, a second widget or operation, a particular widget or operation, a specific widget or operation). The use of these terms herein does not necessarily connote an ordering such as one unit, operation or event occurring or coming before another or another characterization, but rather provides a mechanism to distinguish between elements units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps. Finally, the term "particular machine," when recited in a method claim for performing steps, refers to a particular machine within the 35 USC § 101 machine statutory class.

Figure 1A:
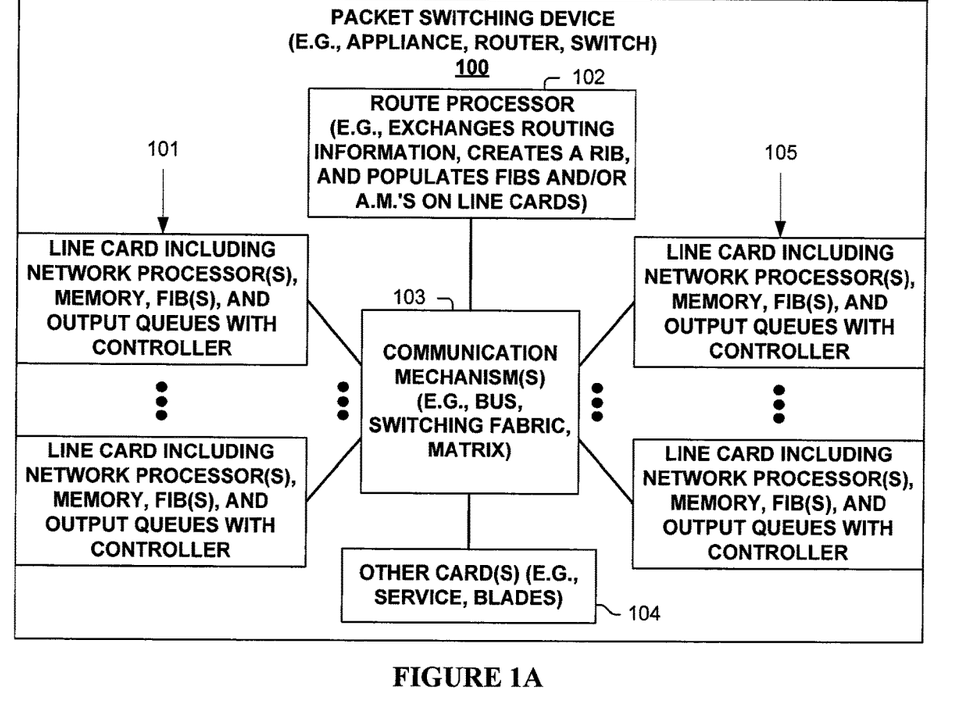
FIG. 1A illustrates a packet switching device according to one embodiment.
Figure 1B:
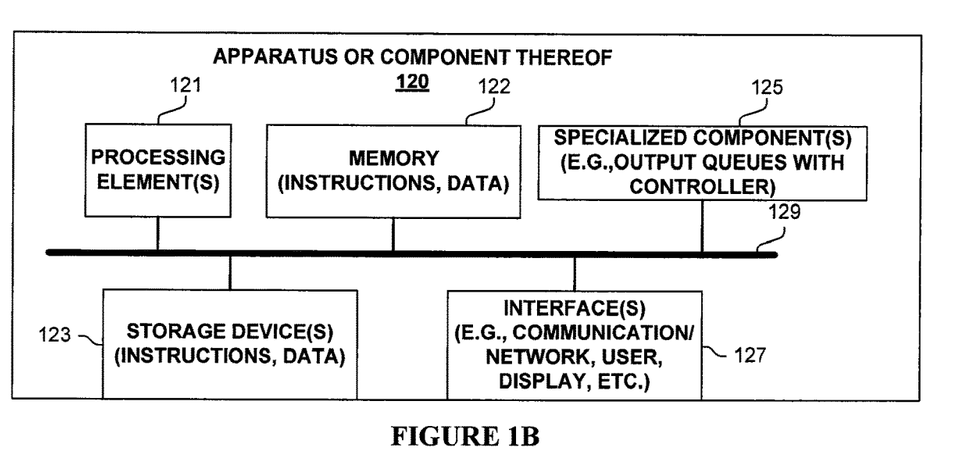
FIG. 1B illustrates an apparatus according to one embodiment.

FIGS. 1A-B and their discussion herein are intended to provide a description of various exemplary packet switching systems used in forwarding packets according to one embodiment. One embodiment automatically cycles among packet traffic flows subjected to varying drop probabilities in a packet network. Packets of the currently selected packet traffic flows are subjected to a drop or forward decision, while packets of other packet traffic flows are typically not so subjected or subjected to a lower drop probity (e.g., approximating zero, at least an order of magnitude less)

One embodiment of a packet switching device 100 is illustrated in FIG. 1A. As shown, packet switching device 100 includes multiple line cards 101 and 105, each with one or more network interfaces for sending and receiving packets over communications links (e.g., possibly part of a link aggregation group), and with one or more processing elements that are used in one embodiment associated with automatically cycling among packet traffic flows and subjecting the currently selected packet flows to varying (typically non-zero) drop probabilities in a packet network, such as, but not limited to in response to congestion in a device or network. Packet switching device 100 also has a control plane with one or more processing elements 102 for managing the control plane and/or control plane processing of packets associated with automatically cycling among packet traffic flows and subjecting the currently selected packet flows to varying drop probabilities in a packet network, such as, but not limited to in response to congestion in a device or network. Packet switching device 100 also includes other cards 104 (e.g., service cards, blades) which include processing elements that are used in one embodiment to process (e.g., forward, drop, manipulate) packets associated with automatically cycling among packet traffic flows and subjecting the currently selected packet flows to varying drop probabilities in a packet network, such as, but not limited to in response to congestion in a device or network, and some communication mechanism 103 (e.g., bus, switching fabric, and/or matrix, etc.) for allowing its different entities 101, 102, 104 and 105 to communicate.

Line cards 101 and 105 typically perform the actions of being both an ingress and egress line card, in regards to multiple other particular packets and/or packet streams being received by, or sent from, packet switching device 100. In one embodiment, network processors on line cards 101 and/or 105 use a controller that automatically cycles among packet traffic flows subjecting them to varying drop probabilities in processing packets (e.g., in determining whether to enqueue a packet in an output queue or drop the packet).

FIG. 1B is a block diagram of an apparatus 120 used in one embodiment associated with automatically cycling among packet traffic flows and subjecting the currently selected packet flows to varying drop probabilities in a packet network, such as, but not limited to in response to congestion in a device or network. In one embodiment, apparatus 120 performs one or more processes, or portions thereof, corresponding to one of the flow diagrams illustrated or otherwise described herein, and/or illustrated in another diagram or otherwise described herein.

In one embodiment, apparatus 120 includes one or more processor(s) 121 (typically with on-chip memory), memory 122, storage device(s) 123, specialized component(s) 125 (e.g. optimized hardware such as for performing lookup and/or packet processing operations, output queues and admit or drop controller, etc.), and interface(s) 127 for communicating information (e.g., sending and receiving packets, user-interfaces, displaying information, etc.), which are typically communicatively coupled via one or more communications mechanisms 129 (e.g., bus, links, switching fabric, matrix), with the communications paths typically tailored to meet the needs of a particular application.

Various embodiments of apparatus 120 may include more or fewer elements. The operation of apparatus 120 is typically controlled by processor(s) 121 using memory 122 and storage device(s) 123 to perform one or more tasks or processes. Memory 122 is one type of computer-readable/computer-storage medium, and typically comprises random access memory (RAM), read only memory (ROM), flash memory, integrated circuits, and/or other memory components. Memory 122 typically stores computer-executable instructions to be executed by processor(s) 121 and/or data which is manipulated by processor(s) 121 for implementing functionality in accordance with an embodiment. Storage device(s) 123 are another type of computer-readable medium, and typically comprise solid state storage media, disk drives, diskettes, networked services, tape drives, and other storage devices. Storage device(s) 123 typically store computer-executable instructions to be executed by processor(s) 121 and/or data which is manipulated by processor(s) 121 for implementing functionality in accordance with an embodiment.

Figure 1C:
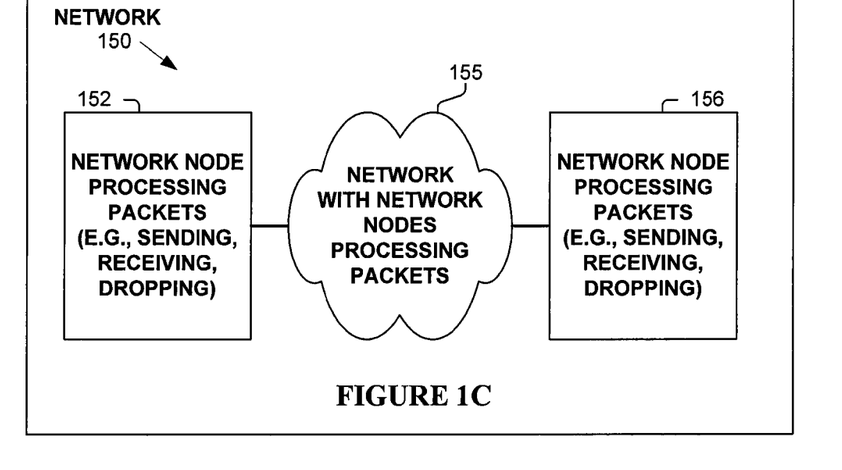
FIG. 1C illustrates a network operating according to one embodiment.

FIG. 1C illustrates a network 150 operating according to one embodiment. As shown, network 150 includes multiple network nodes 152, 156 and network 155 including network nodes, each of which send and receive packets from other nodes in network 155 and/or other communicatively coupled nodes. In one embodiment, at least one of multiple network nodes 152, 156 and in network 155 automatically cycle among packet traffic flows and subject them to varying drop probabilities in response to traffic congestion (e.g., based on a queue occupancy rate or rates).

Figure 2:
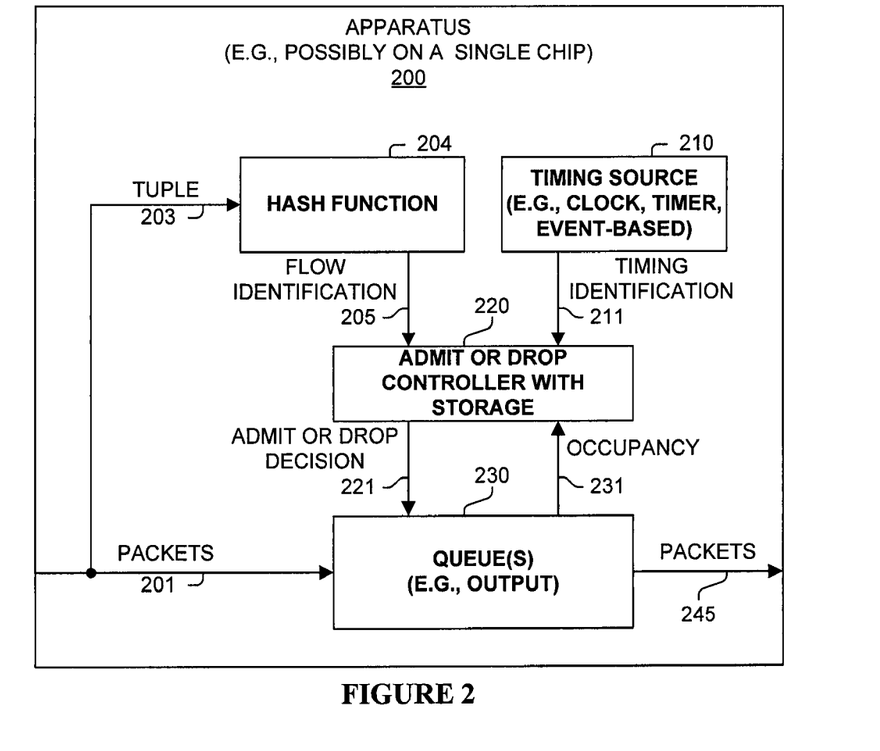
FIG. 2 illustrates an apparatus according to one embodiment.

FIG. 2 illustrates an apparatus 200 according to one embodiment. In one embodiment, apparatus 200 is contained on a single chip. As shown, apparatus 200 includes one or more queues 230 (e.g., one or more outputs), hash function 204, timing source 210, and admit or drop controller with storage 220.

A packet 201 is received by apparatus 200, and will be enqueued in a queue 230 in response to an admit (or not to drop) determination 221 by admit or drop controller 220. In one embodiment, this decision is based on a tuple (e.g., one or more values from fields of the packet 201 typically from the header) provided to hash function 204, which performs a hashing function on tuple 203 and provides flow indication 205 of a packet flow to which the packet (201) is associated. In one embodiment, tuple 203 includes a source address, destination address, source port, destination port, traffic type and/or transportation or other label. In one embodiment, tuple 203 includes a value based on deep packet inspection. In one embodiment, the mapping of packets to packet flows is remapped (e.g., change in hash function, use of different tuples), such as, but not limited to adjusting the groups of packets in one or more of the packet flows, changing the cycling selection order among packet flows, and/or adjusting the efficiency, fairness, or other operational characteristic.

In one embodiment, hash function 204 is performed within admit or drop controller with storage 220. One embodiment uses a hash lookup operation as it maps multiple different tuples 203 into a group (e.g., larger packet flow), which typically reduces the overall number of independent packet flows. The choice of hash function provides a desired granularity and grouping of packet flows. One embodiment does not use a hash function 204, but rather identifies the packet flow directly from, or based, on tuple 203 (e.g., values 203 and 205 are the same in one embodiment).

Admit or drop controller 220 performs a lookup operation based on the identification of the flow (205) to retrieve a corresponding drop probability, or possibly an admit probability which is typically one minus the drop probability. Admit or drop controller 220 makes and provides the determination (221) of whether to drop or enqueue packet 201 in one or more queues 230 based on the current drop or admit probability of the packet flow (205) associated with packet 201. Packets 201 enqueued in queue 230 are dequeued and forwarded from queue 230 as packets 245.

In one embodiment, admit or drop controller with storage 220 maintains a drop probability for each of the packet flows that can be retrieved based on flow identification 205. In one embodiment, if the packet flow is currently not selected, this drop probability is zero or some value much smaller than a drop probability of selected flows. Thus in one embodiment, all or most packet flows are subjected to some drop probability, with that of non-selected packet flows being zero or approximating zero, and that of select packet flows being larger and determined to address detected and/or expected congestion.

Admit or drop controller with storage 220 automatically adjusts over time which packet flows are currently selected, such as, but not limited to, based on an occupancy (231) of one or more queues 230. In one embodiment, packets of the currently selected packet traffic flows are subjected to a drop or forward decision (e.g., based on non-zero drop probability to address congestion), while packets of other packet traffic flows are not so subjected. In one embodiment, timing source 210 (e.g., a clock, timer, event-based) provides a timing indication to which admit or drop controller with storage 220 is responsive in use in adjusting over time which packet flows are currently selected. In one embodiment, timing identification 211 provided by timing source 210 reflects a free-running clock, a non-linear clock, a period clock, a dynamic clock that changes its rate such as in response to congestion, and/or a non-constant rate clock.

By cycling through all of these packet traffic flows, all of these packet flows are subjected to the drop or forward decision in the long term approximately uniformly providing fairness to all packet traffic flows. In the short term, only packets of a currently selected flow are targeted for possible dropping providing unfairness to the currently selected flows, while possibly providing communication efficiencies by affecting the currently selected, but not all flows. One embodiment targets packets of communications sessions so they are subjected to a drop decision all at once when their corresponding flows are selected, and not subjected to dropping when they are not selected.

Figure 3:
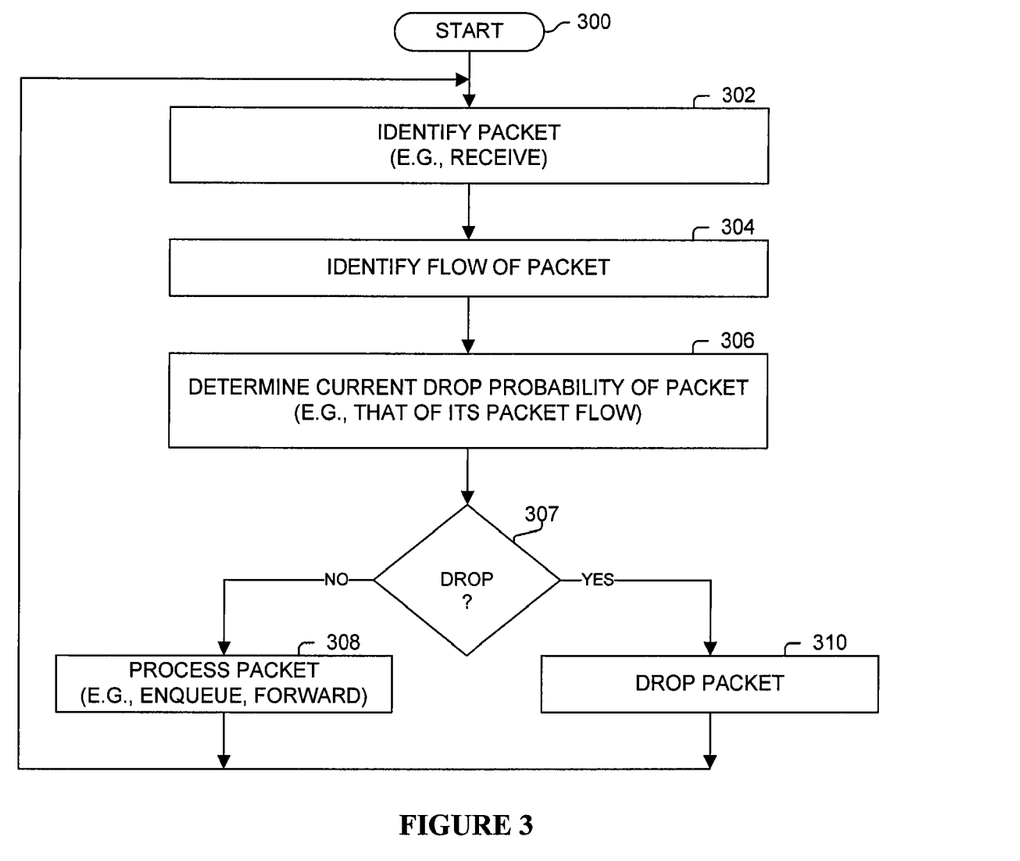
FIG. 3 illustrates a process according to one embodiment.

FIG. 3 illustrates an enqueue or drop decision process according to one embodiment. Processing begins with process block 300. In process block 302, a packet is identified (e.g., received or otherwise generated or created). In process block 304, a packet flow associated with the packet is identified. In process block 306, the current drop probability of the packet is determined (e.g., the drop probability of its packet flow). As determined in process block 307, a drop or admit decision is made based on the drop probability, and correspondingly either the packet is dropped in process block 310 or processed (e.g., enqueued, forwarded) in process block 308. Processing then returns to process block 302 to identify another packet.

Figure 4:
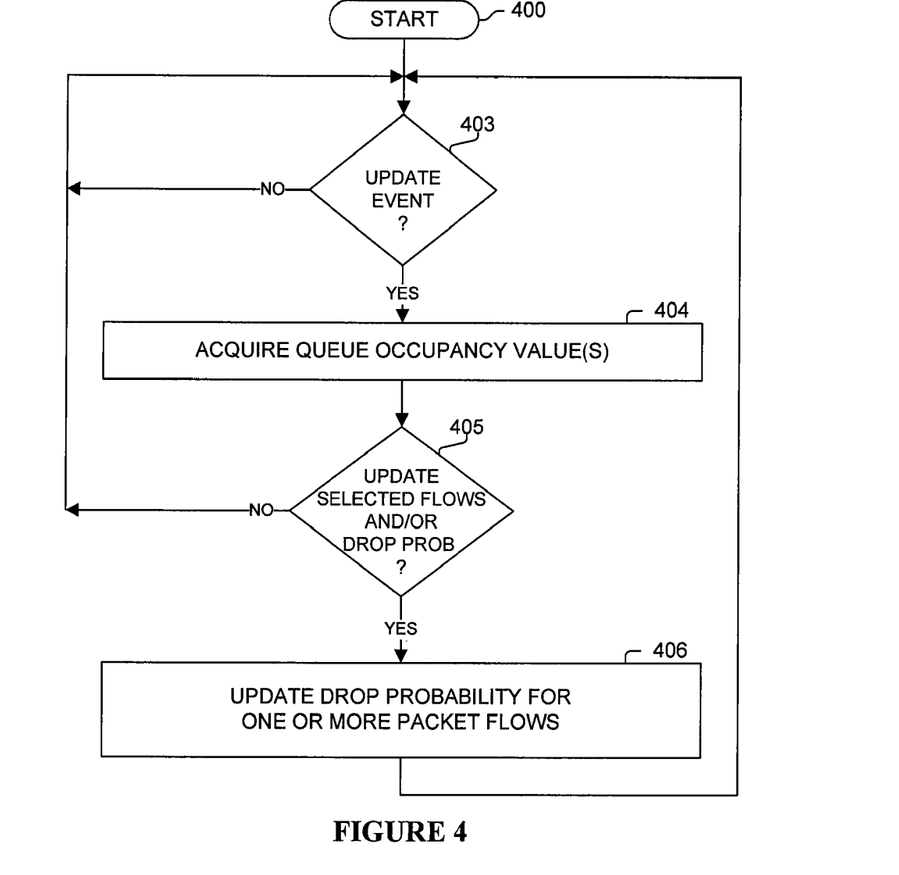
FIG. 4 illustrates a process according to one embodiment.

FIG. 4 illustrates a process for cycling through or adjusting over time which flows are currently selected and their corresponding drop probabilities according to one embodiment. Processing beings with process block 400. As determined in process block 403, if there is an update event (e.g., time to update, congestion detected, no longer congestion), then processing proceeds to process block 404; otherwise processing remains at process block 403. In process block 404, one or more queue occupancy values are acquired as these reflect a level of congestion at a corresponding place in the network node (possibly also reflecting a level of congestion downstream in a network). As determined in process block 405 based on the level of congestion (e.g., one or more occupancy values), if no change is required then processing returns to process block 403; else processing proceeds to process block 406. In process block 406, the currently selected flows and/or their respective drop probabilities are updated accordingly. Processing returns to process block 403.

Figure 5:
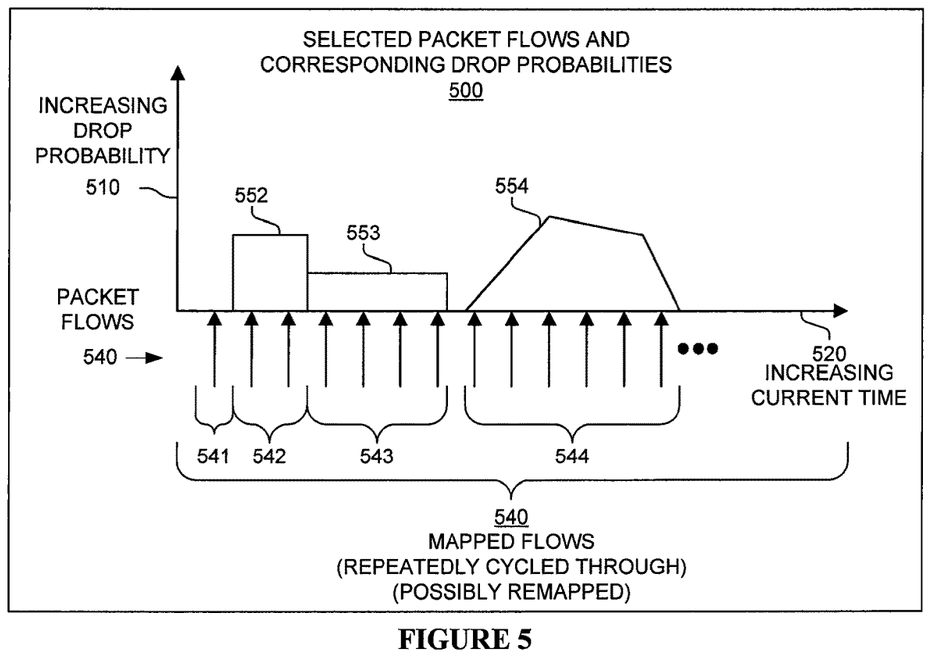
FIG. 5 illustrates varying drop probabilities and packets currently subjected thereto according to one embodiment.

FIG. 5 illustrates varying drop probabilities and selected packet flows (500) currently subjected thereto according to one embodiment. In one embodiment, packets of a not selected packet flow are subjected to a zero drop probability. In one embodiment, packets of a not selected packet flow are subjected to a small drop probability (e.g., approximating zero, or at least an order of magnitude less than a drop probability of a selected flow). In one embodiment, packets of a selected packet flow are subjected to a larger drop probability for effecting an amount of packet traffic dropped, such as, but not limited to, in response to congestion.

As shown in FIG. 5, the Y-axis illustrates increasing drop probabilities 510, and the X-axis illustrates increasing current time 520. The packet dropping subjected to packet flows 540 (including 541-544 with each arrow representing one or more packet flows) are shown as they occur overtime, with the location of a flow on the X-axis reflecting when that corresponding packet flow is subject to a drop probability such as for reducing congestion. Each of packet flows 541-544 reflects a selected one or multiple packet flows, and corresponding encompassing envelopes 552-554 reflect the amount of time (X-axis) and level of drop probability (Y-axis) to which packet flows 541-544 are subjected. The windows 552-554 reflect the number of packet flows 540 subjected to a drop probability (510) corresponding to the height of a window 552-554.

Instead of applying the drop probability evenly across all flows, one embodiment applies the drop probability unevenly across some flows over the short term, while maintaining uniform dropping for all flows over the long term. It does this by having a probability of participating in a drop decision that varies both by the flow identification and time. This establishes windows of time where packets for particular flows can be dropped as part of drop policy. The drop probabilities and number of packet flows currently effected are typically a function of detected actual or expected congestion. One embodiment subjects one or more packet flows to a drop decision in response to a high or higher occupancy level of an output queue in order to reduce or prevent tail dropping.

In one embodiment, the number of packet flows selected and thus subjected to a drop decision and their respective rates (e.g., an aggregate amount of packet traffic) and the corresponding one or more drop probabilities determine the amount of traffic dropped (and otherwise processed such as being forwarded or enqueued). Thus, by increasing or decreasing the number of selected active packet flows (in light of their respective packet rates) and/or corresponding drop probabilities, the aggregate amount of packet traffic dropped can be increased or decreased such as, but not limited to respond to the level of detected or anticipated congestion (which could be none).

In one embodiment, when an occupancy level of a queue is at or above a certain amount or is trending that way, then the amount of packet traffic (e.g., a function of the number of flows and their traffic rates, and drop probabilities associated therewith) subjected to packet dropping is increased to reduce or prevent an overflow of the queue and/or decreasing the occupancy level of the queue. In one embodiment, if an occupancy level of a queue is at or below a certain amount or is trending that way, then the amount of packet traffic subjected to packet dropping is decreased to increase or maintain the occupancy level of the queue. In one embodiment, the mapping of packets to packet flows is remapped (e.g., change in hash function, use of different tuples), such as, but not limited to adjusting the groups of packets in one or more of the packet flows, changing the cycling selection order among packet flows, and/or adjusting the efficiency, fairness, or other operational characteristic.

As illustrated, at a particular time, one or more flows 541 are subjected to a zero drop probability (510). As time progresses (520), packet flows 542 are correspondingly subjected to a same drop probability (510) reflected by window 552. As time progresses (520), packet flows 543 are correspondingly subjected to a same drop probability (510) reflected by window 553 (which has a lower drop probability 510 than window 552). As time progresses (520), one or more packet flows 544 are correspondingly subjected to a drop probability (510) reflected by window 554, with this drop probability (510) varying over time (520), such as, but not limited to, to actively respond to detected or anticipated congestion or lack thereof.

Thus, in the short run, certain one or more packet flows are targeted and subjected to possible dropping, while other packet flows are not which is currently unfair to those targeted packet flows. However, one embodiment cycles through all of the packet flows in a time frame (e.g., one or more roundtrip times between a sender and receiver in the network) and subjects all flows to possible dropping in providing an overall fairness to all packet flows.

In view of the many possible embodiments to which the principles of the disclosure may be applied, it will be appreciated that the embodiments and aspects thereof described herein with respect to the drawings/figures are only illustrative and should not be taken as limiting the scope of the disclosure. For example, and as would be apparent to one skilled in the art, many of the process block operations can be re-ordered to be performed before, after, or substantially concurrent with other operations. Also, many different forms of data structures could be used in various embodiments. The disclosure as described herein contemplates all such embodiments as may come within the scope of the following claims and equivalents thereof.

What is claimed is:

1. A method, comprising:
   concurrently with repeatedly cycling through all of a plurality of packet flows according to a current cycling selection order by a network node, the network node processing each particular packet of a plurality of packets according a result of a packet dropping determination based on whether a corresponding particular packet flow of the plurality of packet flows that includes said particular packet is currently selected;
   wherein during each particular cycle of said cycling through all of the plurality of packet flows according to the current cycling selection order, repeatedly currently selecting one or more, but less than all, of the plurality of packet flows for a sequential window of time in which packets of said currently selected packet flows are subjected to a current drop probability and with packets in the plurality of packets not in said currently selected not being subjected to the current drop probability; wherein all of the plurality of packet flows are said currently selected in each said particular cycle;
   wherein said processing said particular packet includes forwarding said particular packet from a particular location in response to said packet dropping determination being to forward or not to drop said particular packet, and dropping said particular packet in response to said packet dropping determination being to drop or not to forward said particular packet.

2. The method of claim 1, wherein said packets in the plurality of packets that are not in said selected packet flows are subjected to a second current drop probability being at least an order of magnitude less than the current drop probability.

3. The method of claim 1, wherein the particular location includes one or more queues; and where said forwarding said particular packet includes enqueuing said particular packet into one of said one or more queues.

4. The method of claim 3, wherein said one or more queues consists of a single output queue.

5. The method of claim 3, including adjusting, based on an occupancy level of said one or more queues, the current drop probability.

6. The method of claim 5, including adjusting, based on an occupancy level of said one or more queues, a number of the plurality of packet flows in said currently selected packet flows.

7. The method of claim 3, including adjusting, based on an occupancy level of said one or more queues, a number of the plurality of packet flows in said currently selected packet flows.

8. The method of claim 1, wherein said particular packet is identified as being in or not in said currently selected packet flows based on a particular hash key determined based on said particular packet.

9. The method of claim 1, wherein said current drop probability of each selected packet flow is greater than said current drop probability of each non-selected packet flow; and wherein said current drop probability of at least one non-selected packet flow is non-zero and is at least one order of magnitude less than said current drop probability of each said selected packet flow.

10. The method of claim 9, wherein the particular location includes one or more queues; and where said forwarding said particular packet includes enqueuing said particular packet into one of said one or more queues.

11. The method of claim 10, including adjusting, based on an occupancy level of said one or more queues, a number of the plurality of packet flows in the current one or more selected packet flows.

12. A method, comprising:
concurrently with repeatedly cycling through all of a plurality of packet flows by a network node, the network node processing each particular packet of a plurality of packets according a result of a packet dropping determination based on a current drop probability of a corresponding particular packet flow of the plurality of packet flows that includes said particular packet;
wherein for each particular cycle of said cycling through all of the plurality of packet flows, repeatedly selecting a current one or more, but less than all, selected packet flows of the plurality of packet flows, wherein all of the plurality of packet flows are said selected as in the current one or more selected packet flows in said particular cycle;
wherein said processing said particular packet includes forwarding said particular packet from a particular location in response to said packet dropping determination being to forward or not to drop said particular packet, and dropping said particular packet in response to said packet dropping determination being to drop or not to forward said particular packet; and
wherein said current drop probability of a non-selected packet flow is less than said current drop probability of a selected packet flow;
wherein said repeatedly cycling through all of the plurality of packet flows is performed in a first sequential order of the plurality of packet flows for a first cycle of said cycles and in a second sequential order of the plurality of packet flows for a second cycle of said cycles, with the first and second cycles being different, and with the first and second sequential orders being different.

13. The method of claim 1, wherein said packets in the plurality of packets that are not in said selected packet flows are subjected to a second current drop probability of zero.

14. An apparatus, comprising:
one or more packet queues; and
a hardware admit or drop controller, with storage, repeatedly cycling through all of a plurality of packet flows while processing each particular packet of a plurality of packets according a result of a packet dropping determination based on a current drop probability of a corresponding particular packet flow of the plurality of packet flows that includes said particular packet;
wherein for each particular cycle of said cycling through all of the plurality of packet flows, repeatedly selecting a current one or more, but less than all, selected packet flows of the plurality of packet flows, wherein all of the plurality of packet flows are said selected as in the current one or more selected packet flows in said particular cycle;
wherein said processing said particular packet includes enqueuing said particular packet into a particular queue of said one or more packet queues in response to said packet dropping determination being to forward or not to drop said particular packet, and dropping said particular packet in response to said packet dropping determination being to drop or not to forward said particular packet; and
wherein said current drop probability of a non-selected packet flow is less than said current drop probability of a selected packet flow; and
wherein said repeatedly cycling through all of the plurality of packet flows is performed in a first sequential order of the plurality of packet flows for a first cycle of said cycles and in a second sequential order of the plurality of packet flows for a second cycle of said cycles, with the first and second cycles being different, and with the first and second sequential orders being different.

15. The apparatus of claim 14, wherein said current drop probability of each non-selected packet flow is at least an order of magnitude less than said current drop probability of each selected packet flow.

16. The apparatus of claim 14, wherein said one or more packet queues consists of a single output queue storing packets to be forwarded from an output interface of the apparatus.

17. The apparatus of claim 14, wherein the apparatus adjusts a number of the plurality of packet flows in the current one or more selected packet flows according to one or more occupancy levels of said one or more queues.

18. The apparatus of claim 14, wherein the apparatus adjusts said current drop probability of one or more of the plurality of packet flows according to one or more occupancy levels of said one or more queues.

19. The apparatus of claim 14, wherein said current drop probability of at least one non-selected packet flow is non-zero.

* * * * *